(12) United States Patent
Grace et al.

(10) Patent No.: US 6,547,273 B2
(45) Date of Patent: Apr. 15, 2003

(54) INFLATABLE SEAT RESTRAINT SYSTEM USING AN INFLATION INTEGRATED INERTIA REEL

(75) Inventors: Gregory B. Grace, Mesa, AZ (US); Brent K. Olson, Chandler, AZ (US)

(73) Assignee: Simula, Inc., Phoenix, AZ (US)

( * ) Notice: Subject to any disclaimer, the term of this patent is extended or adjusted under 35 U.S.C. 154(b) by 15 days.

(21) Appl. No.: 09/962,071

(22) Filed: Sep. 26, 2001

(65) Prior Publication Data

US 2002/0041088 A1 Apr. 11, 2002

Related U.S. Application Data

(60) Provisional application No. 60/237,684, filed on Oct. 5, 2000.

(51) Int. Cl.[7] ............................................... B60R 21/18
(52) U.S. Cl. ..................... 280/733; 280/801.1; 280/806
(58) Field of Search ........................... 280/733, 801.1, 280/801.2, 806, 807, 808; 297/468, 470, 471, 475, 483

(56) References Cited

U.S. PATENT DOCUMENTS

| | | | | |
|---|---|---|---|---|
| 4,191,344 A | * | 3/1980 | Tillac | 242/374 |
| 4,915,413 A | * | 4/1990 | Meyer | 280/801.1 |
| 5,288,104 A | * | 2/1994 | Chen | 280/733 |
| 5,303,953 A | | 4/1994 | Kamiyama et al. | |
| 5,445,411 A | | 8/1995 | Kamiyama et al. | |
| 5,465,999 A | | 11/1995 | Tanaka et al. | |
| 5,571,253 A | * | 11/1996 | Blackburn et al. | 180/282 |
| 5,599,070 A | * | 2/1997 | Pham et al. | 297/483 |
| 5,839,753 A | | 11/1998 | Yaniv et al. | |
| 5,924,640 A | | 7/1999 | Hickey | |
| 6,276,715 B1 | * | 8/2001 | Takeuchi | 280/733 |

* cited by examiner

Primary Examiner—Paul N. Dickson
Assistant Examiner—Faye M. Fleming
(74) Attorney, Agent, or Firm—Shaw Pittman LLP

(57) ABSTRACT

An inflatable seat belt restraint system including a shoulder belt, an inflatable restraint, an inflation integrated inertia reel, and a shoulder belt anchor opposite to the inflation integrated inertia reel. The system can further include a lap belt and lap belt inertia reel. The inflation integrated inertia reel includes a webbing anchor, a drum having a pressure vessel, and a port for ducting inflation gas from the pressure vessel to the inflatable restraint. The inflation integrated inertia reel can further include an inflator in fluid communication with the pressure vessel. Upon deployment, gas flows from the inflator, into the pressure vessel, through the port, and into the inflatable restraint. The system can also include, a pressure-actuated locking mechanism locks the drum when the pressure vessel is pressurized. A corresponding method for deploying an inflatable restraint is also disclosed.

8 Claims, 13 Drawing Sheets

INFLATABLE SEAT RESTRAINT SYSTEM USING AN INFLATION INTEGRATED INERTIA REEL

This application claims the benefit of the filing date of U.S. Provisional Application No. 60/237,684, filed Oct. 5, 2000, which is hereby incorporated by reference in its entirety.

BACKGROUND

1. Field of the Invention

The present invention relates generally to vehicle occupant restraint systems, and more particularly, to a seat belt restraint system that incorporates an inflatable section into the torso section of the belt.

2. Background of the Invention

Inflatable seat restraint systems have proven to be a dramatic improvement over ordinary three-point seat belts. Unlike ordinary belts, these systems incorporate inflatable restraints that fill with gas immediately upon vehicle impact. The inflatable restraints pretension the systems with a force sufficient to counter body loading, to restrict occupant motion during a crash, and to distribute crash loads over larger occupant surface area, thus minimizing injury.

FIGS. 1a–1e illustrate a typical prior art inflatable seat restraint system, as disclosed in the commonly assigned U.S. Pat. No. 5,839,753 to Yaniv et al., which is incorporated by reference herein. The system includes lap belt 102, shoulder or torso belt 103, including an inflatable restraint 101, buckle assembly 105, anchor 106, anchored inertia reels 117 and 118, gas generator 122, and a sensor assembly (not shown).

As shown in FIG. 1c, lap belt 102 and shoulder belt 103 form one continuous strap which passes through the male portion of buckle assembly 105. Lap belt 102 is designed to restrict the forward motion of a seated occupant at the pelvis. Lap belt 102 is connected to anchored inertia reel 117, which pivotally mounts lap belt 102 to the floor or seat structure on the door-side of seat 121 (as shown in FIGS. 1a and 1b). The other end of lap belt 102 loops through the male portion of buckle assembly 105, so that the length of lap belt 102 can be adjusted to accommodate a wide range of occupant sizes.

The female portion of buckle assembly 105 is attached to buckle strap 107. Buckle strap 107 is pivotally mounted to an attachment point in the vehicle, such as the base of seat 121, or a floor structure on the side of seat 121 that is farthest from the door, by anchor 106. The female and male portions of buckle assembly 105 fasten together, thus securing seat belt system 110 around the occupant in a manner similar to that of conventional three-point seat belt systems.

As shown in FIG. 1d, gas generator 122 is typically mounted inside the seat back. The gas generator is also sometimes located in the seat base. Durable tubing 116 provides a fluid path from gas generator 122 to inflatable restraint 101.

As shown in FIG. 1c, inflatable restraint 101 is attached to shoulder belt 103 and extends diagonally from the occupant's hip to behind and above the occupant's shoulder. The upper end of inflatable restraint 101 loops through a D-ring 108 that is mounted to seat 121 as shown (FIG. 1d) or to the vehicle (e.g., at the roof rail or at the upper B-pillar area (not shown)). D-ring 108 acts as an intermediate guide for shoulder belt 103, setting the height at which shoulder belt 103 wraps over the occupant's shoulder. Shoulder belt 103 is then anchored to seat 121 or the vehicle (not shown) by an inertia reel 118.

As shown in FIG. 1a, shoulder strap 103 is routed inside the vehicle seat to inertia reel 118, which is mounted in the lower portion of the seat back. Thus, as shown in FIGS. 1b and 1d, tubing 116 provides fluid communication from the gas generator to inflatable restraint 101 in the torso of the restraint system.

As best shown in FIG. 1d, when a collision occurs, the crash sensor sends a signal to the initiator in gas generator 122. The initiator then ignites the gas generator 122, which forces gas through durable tubing 116 and into inflatable restraint 101. As the gas flows into inflatable restraint 101, the internal pressure causes the tube diameter to increase and the tube length to decrease. At the same time, seat belt system 110 is constrained on the outboard side by inertia reel 117 and on the inboard side by anchor 106, and behind the shoulder by inertia reel 118. Inertia reels 117 and 118 lock up during impact, preventing payout of the belt. Thus, as inflatable restraint 101 contracts, it pulls any slack out of seat belt system 110. The occupant is thus provided with a pretensioned seat belt, which restricts the forward motion of the occupant and reduces primary injuries.

Typically, conventional inflatable seat belt restraint systems mount inflators in one of two locations: 1) either behind the seat for inflation from behind the occupant and over the shoulder, or 2) at the buckle for inflation from the buckle up to the occupant's shoulder. The inflatable seat restraint system of FIGS. 1a–1e is an example of this first configuration, which is referred to herein as the shoulder-fill design. The second configuration is referred to herein as the buckle-fill design. As used herein, inflator means any device that fills an inflatable restraint during system deployment, e.g., a gas generator.

For both the shoulder-fill and buckle-fill designs, providing shoulder belt height adjustment to accommodate different torso lengths is a significant concern. To provide maximum occupant protection, the intermediate guide for the shoulder belt (e.g., D-ring 108 in FIGS. 1a–1e) must not be below or too far above the occupant's shoulder. Indeed, most manufacturers and safety experts recommend that the intermediate guide be positioned at or above an occupant's shoulder, with a maximum shoulder belt angle of 30° above horizontal. Such shoulder belt height adjustments are simple for conventional three-point seat belt systems, which have no inflatable restraints. However, substantial difficulties arise when incorporating sections of inflatable restraint.

For example, shoulder-fill designs, such as the design illustrated in FIGS. 1a–1e, mount the inflator in a fixed position and use a high-pressure hose to connect the inflator to the inflatable restraint. The high-pressure hose is flexible to accommodate shoulder belt height adjustments, e.g., when D-ring 108 is raised to wrap the belt over an occupant with a longer torso. Although this shoulder-fill design permits moderate shoulder belt height adjustment, the inflatable restraint must pass through the intermediate guide. Because the inflatable restraint tends to be bulky and stiff, the inflatable restraint and the webbing to which it is attached often kink and bunch around the intermediate guide. In addition, the small diameter of a typical intermediate guide (e.g., a D-ring) pinches the inflatable restraint and webbing. These restrictions cause uneven travel and deployment of the inflatable restraint, resulting in inadequate occupant protection. Although providing stronger clock springs on the inertia reel that feeds the webbing may help force the inflatable restraint over the intermediate guide and reduce kinking and bunching, the stronger pull compromises occupant comfort.

In an attempt to accommodate different height adjustments, designers have proposed various modifications to the shoulder-fill design, each with significant drawbacks. Such modifications have included inflators attached directly to the webbing, inflators mounted on linear slides or guides, and inflators mounted on swing arm devices. In providing a degree of shoulder belt height adjustment, each modification compromises occupant comfort or safety in some way. For example, in the systems that move the inflator in concert with the movement of the inflatable restraint, difficulty in sliding or translating the inflator is a common problem.

In addition, shoulder-fill systems that attach the inflator directly to the webbing encounter undesirably high inertial loading during webbing retraction and payout, and during crash events. Installing counterweights and springs can offset this high inertial loading, but requires more parts, increased complexity, and higher costs.

Shoulder-fill systems that mount the inflator on a linear slide can reduce sliding friction. However, these designs also suffer from the undesirably high inertial loading described above.

Shoulder-fill systems that mount the inflator to a swing arm also experience undesirably high inertial loading, unless the inflator is connected through a fluid coupler that pivots about the axis of rotation of the swing arm. However, again, installing the fluid coupler increases the cost and complexity of the system.

All of the modified shoulder-fill designs require some provision for stopping the inertial loads of the inflator in the event of a crash. The webbing feels cumbersome to the occupant due to the inertial loading of the translating inflator. Thus, the conventional shoulder-fill designs fail to provide an optimal solution.

Buckle-fill designs suffer from drawbacks as well. For example, a typical buckle-fill design fixes the inflatable restraint at the buckle where the gas is injected. An inertia reel mounted behind the seat lets out and retracts the webbing to accommodate the raising and lowering of the intermediate guide for shoulder belt height adjustment. Because this design requires that the inflatable restraint be fixed at the buckle, the length of the inflatable restraint remains unchanged as the intermediate guide is raised. Thus, when the intermediate guide is raised to its highest point, the inflatable restraint may not reach the shoulder of an occupant with a longer torso, therefore compromising occupant protection in this area.

To provide inflatable restraint protection in this unprotected area, the design could extend the inflatable restraint up to the intermediate guide for the occupant with a longer torso. However, when the intermediate guide is lowered for smaller occupants, the inflatable restraint would have to pass through the intermediate guide, thereby raising the same problems discussed above for shoulder-fill designs (i.e., uneven travel and deployment due to kinking, bunching, and pinching).

In addition to inadequate shoulder belt height adjustment, the shoulder-fill and buckle-fill designs require a large number of components and several complex connections. For example, both designs necessitate a separate inflator housing and the shoulder-belt design requires large amounts of expensive high-pressure hose to connect the inflator to the inflatable tubular structure. In addition, the designs rely on conventional inertia reels, which are not designed for inflatable seat belt restraint systems and therefore can often be unreliable.

SUMMARY OF THE INVENTION

The present invention is an inflatable seat belt restraint system, and a corresponding method for deploying an inflatable seat belt restraint, which use an inflation integrated inertia reel to provide a wide range of shoulder belt adjustment. The inflation integrated inertia reel mounts above an occupant's shoulder and secures both the shoulder belt webbing and inflatable restraint of the restraint system. An inflator in fluid communication with the inflation integrated inertia reel generates pressurized gas that flows into the inflation integrated inertia reel and then into the inflatable restraint. The pressurized gas can also be used to positively lock up the inflation integrated inertia reel.

In mounting the inflation integrated inertia reel above the occupant's shoulder, the present invention eliminates the need for an intermediate guide and thereby solves the problems associated with the bunching and kinking of the inflatable restraints. In addition, by combining the inflator housing and inertia reel into a single component, the present invention uses fewer parts than prior art systems. Thus, the present invention provides shoulder belt adjustment with a minimum number of parts and without sacrificing full inflatable restraint protection from an occupant's lap to his shoulder.

In an embodiment of the present invention, the inflatable seat restraint system includes a shoulder belt, an inflatable restraint, an inflator, an inflation integrated inertia reel, and a shoulder belt anchor that opposes the inflation integrated inertia reel. The shoulder belt anchor is preferably a buckle assembly. A lap belt and lap belt inertia reel can also be included to provide full occupant protection. The buckle assembly and lap belt inertia reel are attached to a lower portion of a seat or to a vehicle structure below the seat, and are located on opposite sides of the seat. The inflation integrated inertia reel is attached to an upper portion of the seat or to a vehicle structure proximate to the seat. The lap belt attaches to the lap belt inertia reel and the buckle assembly across an occupant's pelvis. The shoulder belt attaches to the buckle assembly and the inflation integrated inertia reel, and spans the occupant's torso diagonally from shoulder to pelvis. Optionally, the shoulder belt and lap belt could be one continuous belt.

The inflation integrated inertia reel provides several functions of the present invention, including shoulder belt adjustment, gas generation, and the spooling, retracting, and locking of the shoulder belt webbing and inflatable restraint. According to an embodiment of the present invention, the inflation integrated inertia reel includes a webbing anchor, a drum, and a port for ducting the inflation gas to the inflatable restraint. Optionally, the inflation integrated inertia reel also includes a locking mechanism that detects a crash event and locks the drum.

The webbing anchor secures the shoulder belt to the drum of the inflation integrated inertia reel. The port is adapted to fluidly connect an inflatable restraint to the drum and is positioned on the drum beyond the webbing anchor, so that the inflatable restraint lies on top of the webbing of the shoulder belt when the drum spools up. The drum includes a pressure vessel that contains gases generated by an inflator so that the gases are directed out of the port to fill the inflatable restraint. The inflator is in fluid communication with drum, and is preferably located inside the drum. Thus, in effect, the drum of the inflation integrated inertia reel acts as the inflator housing, holding the inflator and ducting the discharged gas into the inflatable restraint.

In operation, the drum of the inflation integrated inertia reel rotates to take up and pay out the shoulder belt webbing and the inflatable restraint spooled around it. The rotation allows an occupant to adjust both the tightness of the shoulder belt against his body and the height of the inflation integrated inertia reel. As the occupant pulls on the shoulder belt or raises the inflation integrated inertia reel, the drum rotates to pay out additional lengths of webbing and inflatable restraint. Thus, at any point in its rotation, the inflation integrated inertia reel can deliver an unimpeded charge of gas from inside the drum to the inflatable restraint.

In an embodiment of the present invention, the drum includes a locking mechanism that activates (i.e., stops the drum from rotating) when the drum is pressurized. Thus, during deployment, the gas not only fills the inflatable restraint, but also fills the drum and stops the drum from rotating. The locked drum then restrains the webbing of the shoulder belt and the inflatable restraint, preventing further payout.

In another embodiment of the present invention, the drum is shaped to raise and lower the shoulder belt height as the drum rotates.

In another embodiment of the present invention, a lever arm and stop are added to the inflation integrated inertia reel to provide both shoulder belt height adjustment and shoulder belt length adjustment.

Accordingly, an object of the present invention is to maximize the protection provided by inflatable seat belt restraint systems for occupants of all sizes.

Another object of the present invention is to provide an inflatable seat belt restraint system that provides shoulder belt height and length adjustment.

Another object of the present invention is to provide an inflatable seat belt restraint system that locks up an inertia reel more quickly than conventional inertia reel locking mechanisms.

Another object of the present invention is to reduce the number of components required to provide an inflatable seat belt restraint system with shoulder belt height adjustment.

These and other objects and advantages of the present invention are described in greater detail in the detailed description of the invention, and the appended drawings. Additional features and advantages of the invention will be set forth in the description that follows, will be apparent from the description, or may be learned by practicing the invention.

DESCRIPTION OF THE DRAWINGS

FIG. 8 shows a cross-section of the inertia reel lever arm shown in FIG. 7a.

DETAILED DESCRIPTION OF THE INVENTION

Figure 1A:
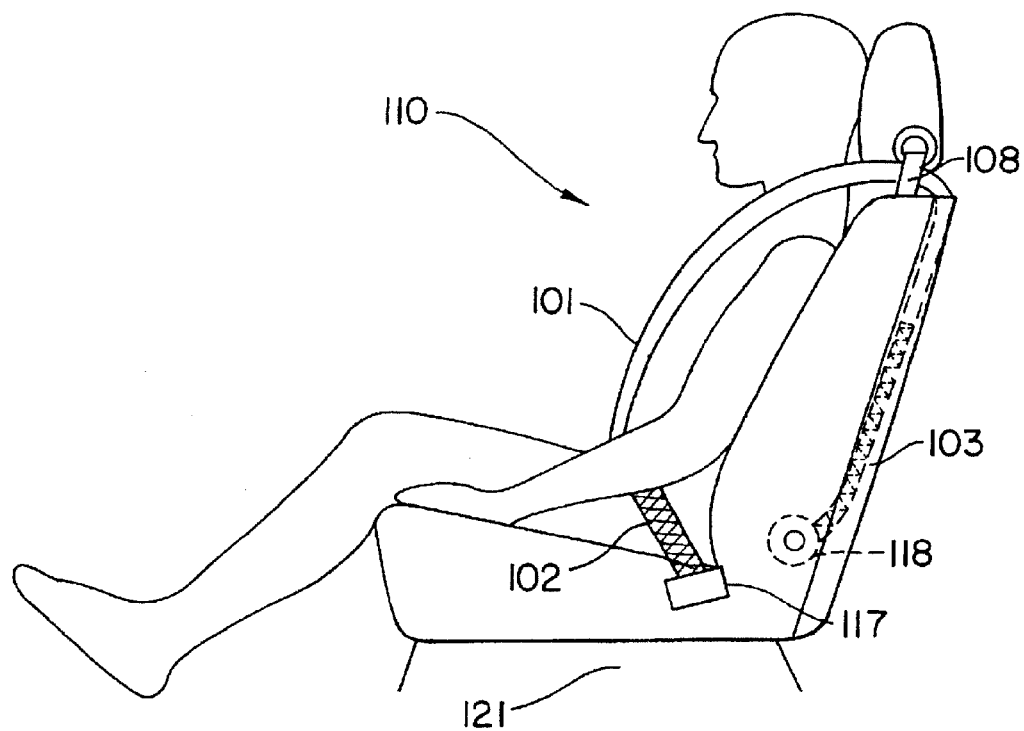
FIG. 1a is a schematic diagram of a side view of a prior art inflatable seat restraint system in an uninflated configuration.
Figure 1B:
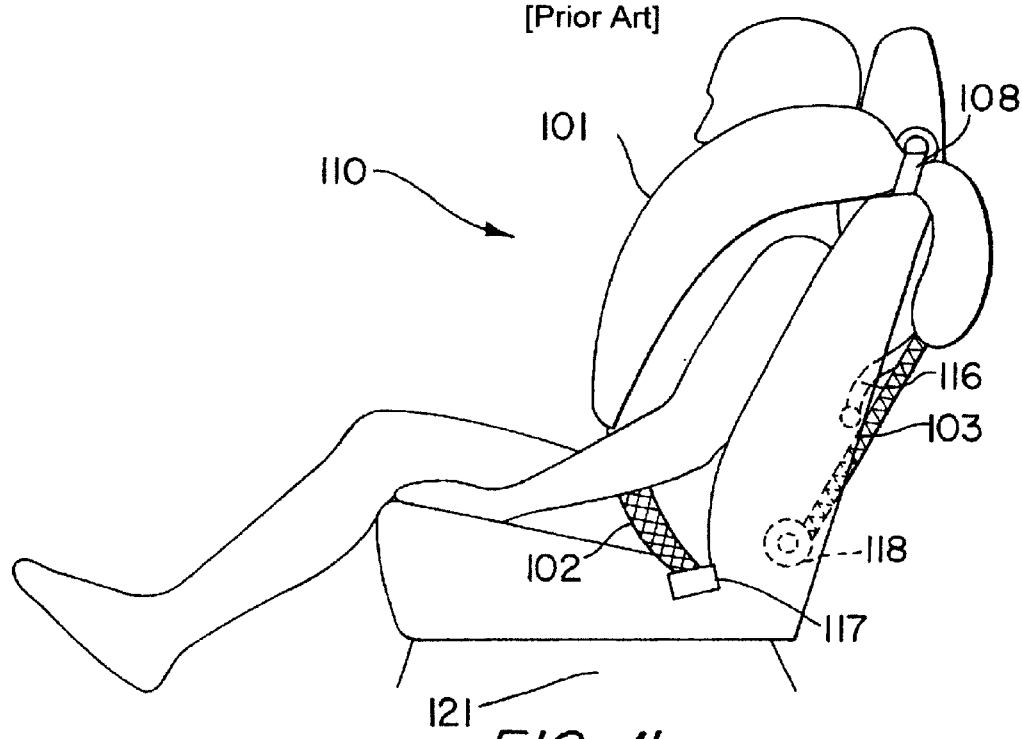
FIG. 1b is a schematic diagram of the prior art inflatable seat restraint system shown in FIG. 1a, in an inflated configuration.
Figure 1C:
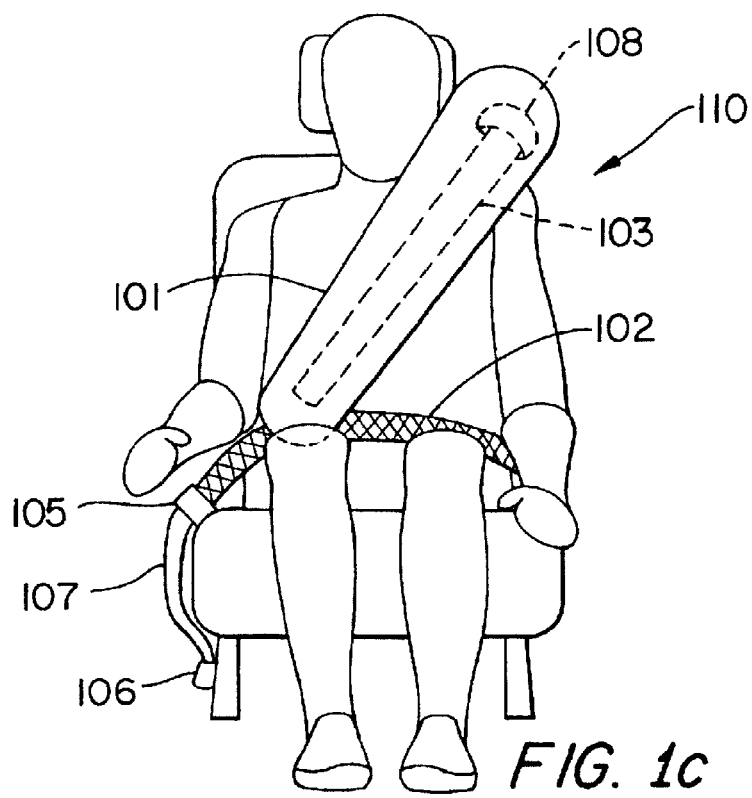
FIG. 1c is a schematic diagram of a front view of the prior art inflatable seat restraint system shown in FIG. 1b, in an inflated configuration.
Figure 1D:
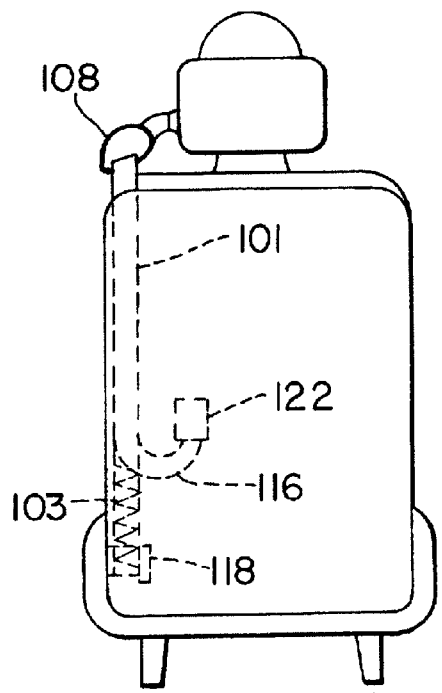
FIG. 1d is a schematic diagram of a cut-away rear view of the prior art inflatable seat restraint system shown in FIG. 1a, in an uninflated configuration.
Figure 1E:
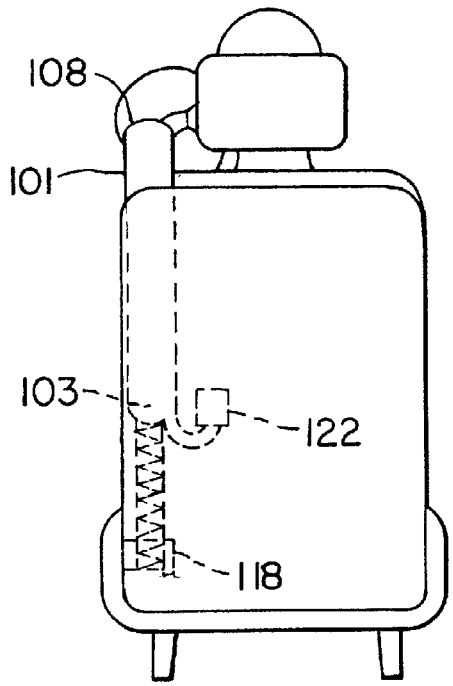
FIG. 1e is a schematic diagram of a cut-away rear view of the prior art inflatable seat restraint system shown in FIG. 1b, in an inflated configuration.
Figure 2:
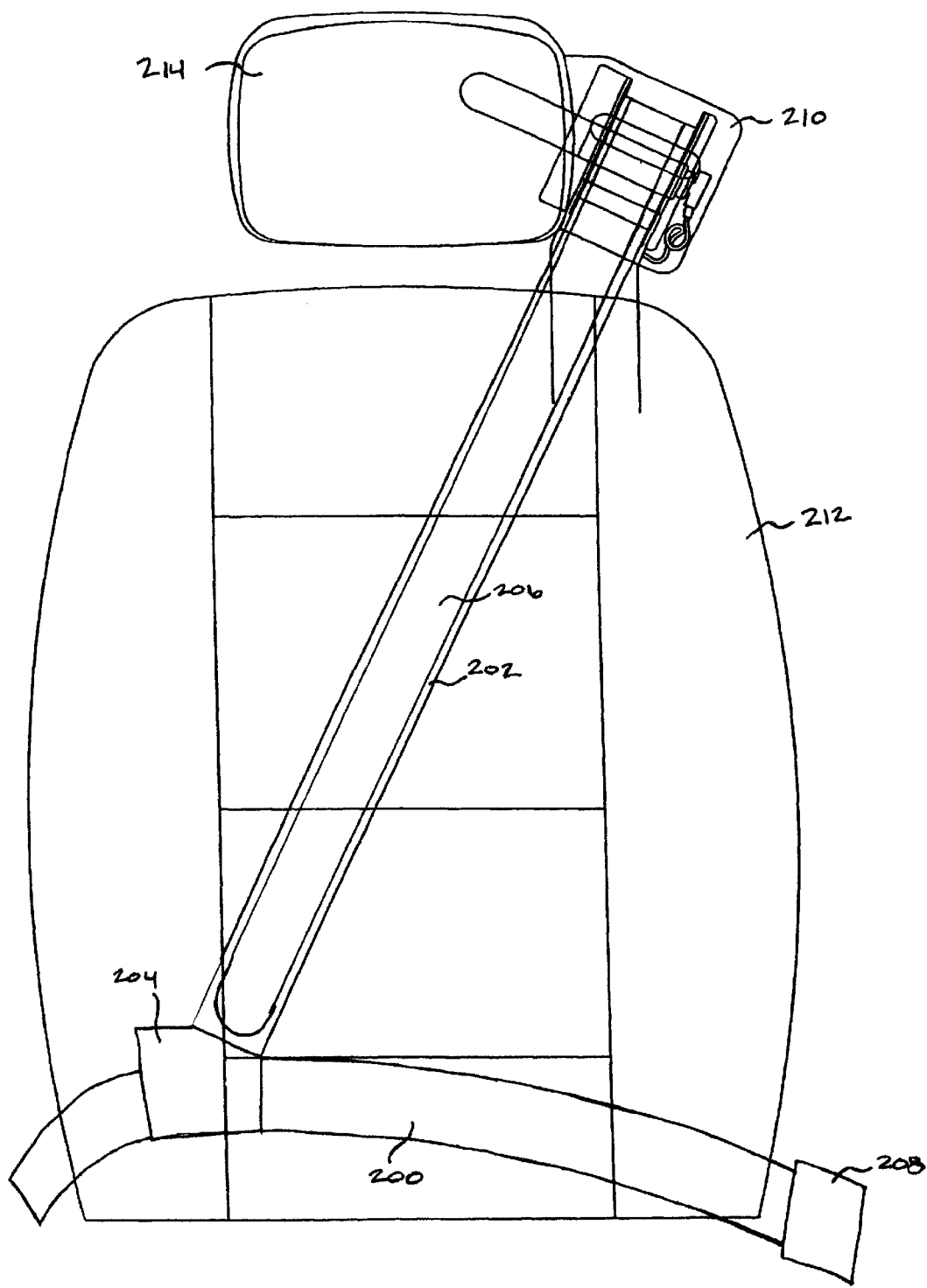
FIG. 2 is a schematic diagram of an inflatable seat belt restraint system according to an embodiment of the present invention.

The present invention is an inflatable seat restraint system, and a corresponding method for deploying an inflatable seat restraint, which provide shoulder belt adjustment without compromising the performance of the inflatable restraint. Referring to FIG. 2, an embodiment of the present invention includes a shoulder belt 202, an inflatable restraint 206, an inflation integrated inertia reel 210, and an inflator, which, in this embodiment, is contained in inflation integrated inertia reel 210. This embodiment also includes an anchor for shoulder belt 202 that opposes inflation integrated inertia reel 210, which in this example is a buckle assembly 204.

Lap belt 200 and lap belt inertia reel 208 are also shown to provide full occupant protection. Buckle assembly 204 and lap belt inertia reel 208 are located on opposite sides of seat 212 and are anchored to seat 212 or to a vehicle structure. As used herein, anchored means fixed to another member either directly or through intermediate components. Although shown as a separate belt, lap belt 200 and shoulder belt 202 could be, for example, a single continuous belt that extends from inflation integrated inertia reel 210 through buckle assembly 204 and to lap belt inertia reel 208. The single strap could be fixed or slideably attached to buckle assembly 204, for example.

Inflation integrated inertia reel 210 may be attached to an upper portion of seat 212 or to a vehicle structure above seat 212. In the embodiment of FIG. 2, inflation integrated inertia reel is fixed to headrest 214, which adjusts up and down for differently sized occupants. Lap belt 200 attaches to lap belt inertia reel 208 and buckle assembly 204 across an occupant's pelvis. Shoulder belt 202, with inflatable restraint 206 mounted on top, attaches to buckle assembly 204 and inflation integrated inertia reel 210, and spans the occupant's torso diagonally from shoulder to pelvis.

Figure 3:
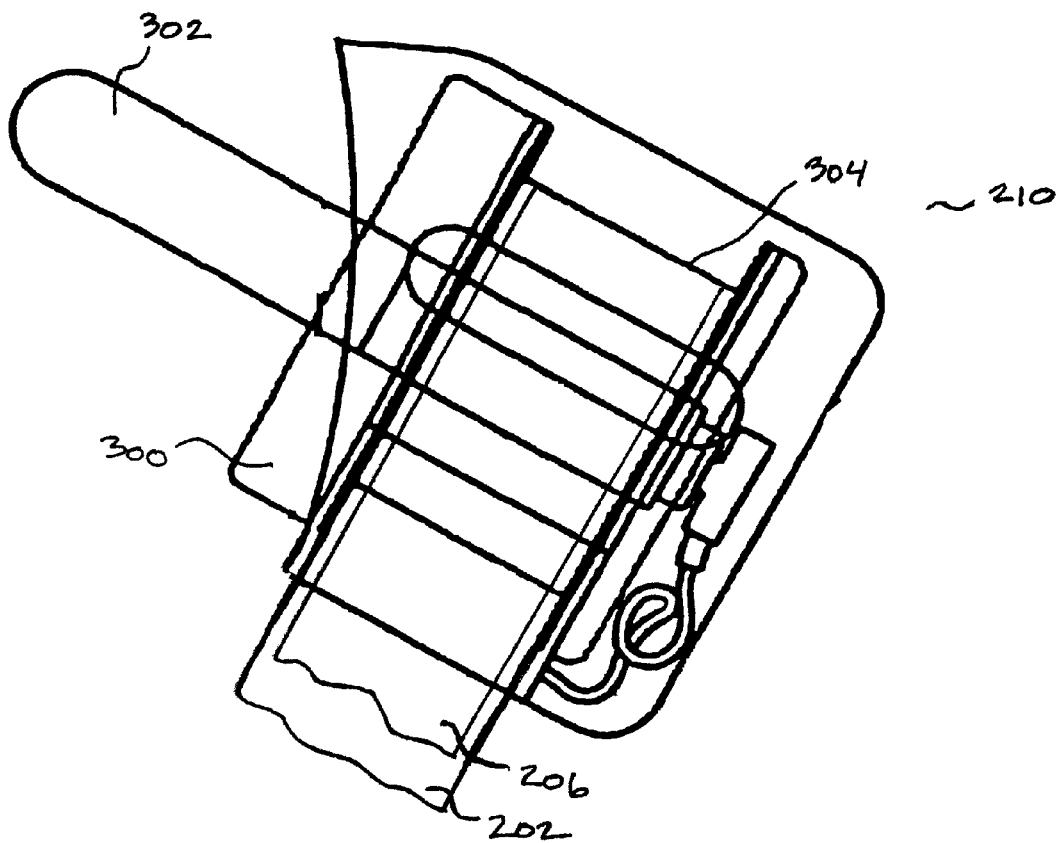
FIG. 3 is a schematic diagram of an enlarged view of the inflation integrated inertia reel shown in FIG. 2.
Figure 4A:
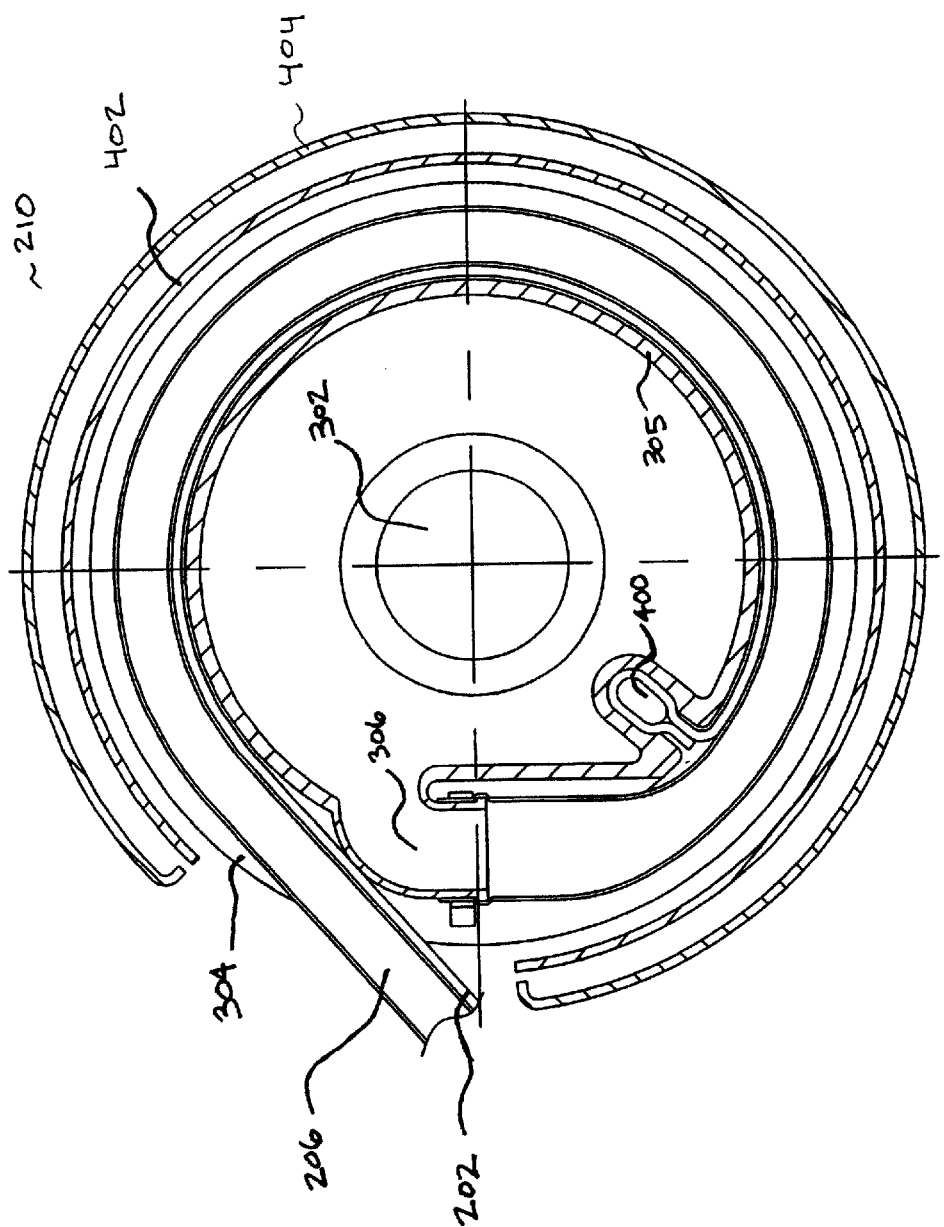
FIG. 4a is a schematic diagram of an axial view of a portion of the inflation integrated inertia reel shown in FIG. 3, according to an embodiment of the present invention.

FIG. 3 shows an enlarged view of the inflation integrated inertia reel 210 depicted in FIG. 2. FIG. 4a shows an axial view of a portion of the inflation integrated inertia reel 210 shown in FIG. 3. As shown in FIG. 3, inflation integrated inertia reel 210 includes an inflator 302 and a drum 304. A conventional inertia reel locking mechanism 300 is also included, which detects a crash event (e.g., an impact above a predetermined threshold) and locks drum 304. Shoulder belt 202 and inflatable restraint 206 are both attached to drum 304. As shown in FIG. 4a, inflation integrated inertia reel 210 further includes a webbing anchor 400 and a port 306. Webbing anchor 400 attaches shoulder belt 202 to drum 304. Port 306 fluidly connects inflatable restraint 206 to drum 304. Inflatable restraint 206 and belt 202 spool onto arm 305 of drum 304.

Port 306 and webbing anchor 400 are positioned on drum 304 so that inflatable restraint 206 lies on top of shoulder belt 202 when drum 304 spools up. For example, in FIG. 4a, drum 304 spools up in a clockwise direction, requiring port 306 to be positioned in advance of webbing anchor 400 in a clockwise direction. Port 306 provides fluid communication between inflatable restraint 206 and the interior of drum 304. Optionally, a short section of high-pressure hose could be used between port 306 and inflatable restraint 206 to facilitate the connection. Also, optionally, the inflation gas could be ducted to drum 304 using an axial connection similar to the connection used on a garden hose spool.

Figure 4B:
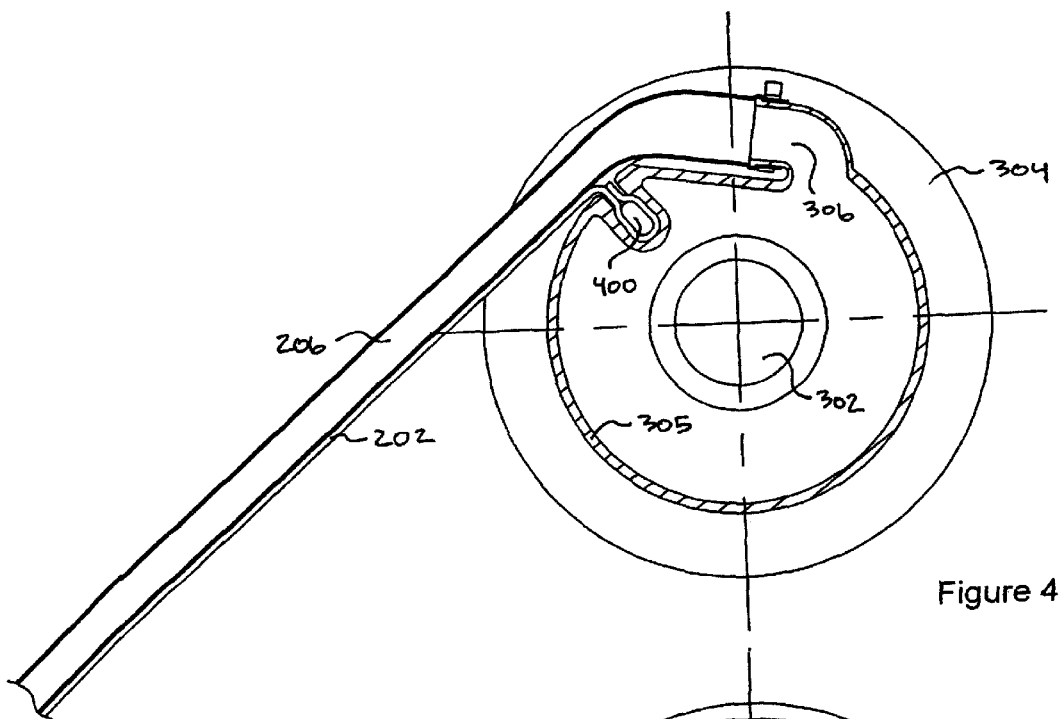
FIG. 4b is a schematic diagram of the inflation integrated inertia reel shown in FIG. 4a, with the belt and inflatable restraint fully paid out and with the shroud and decorative cover removed for clarity.
Figure 4C:
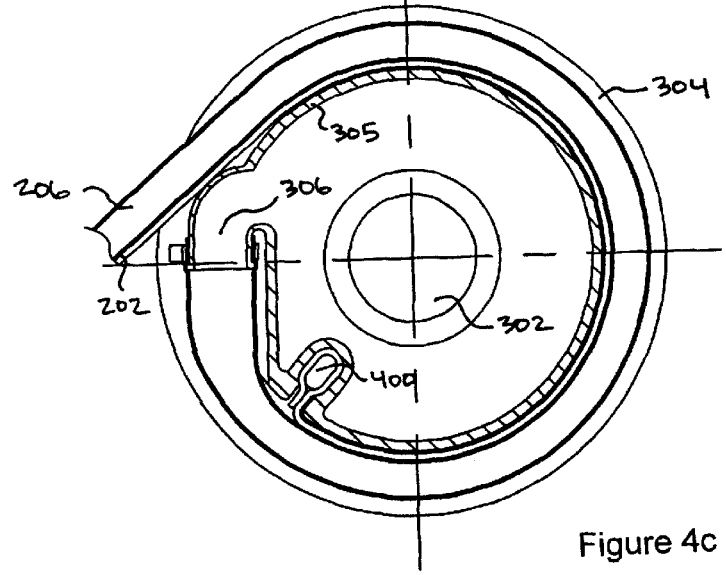
FIG. 4c is a schematic diagram of the inflation integrated inertia reel shown in FIG. 4a, with the belt and inflatable restraint fully retracted and with the shroud and decorative cover removed for clarity.

FIGS. 4b and 4c illustrate drum 304 in a fully paid out and fully retracted position, respectively. As shown by these relative positions, drum 304 rotates up to substantially one revolution such that inflatable restraint 206 spools up a maximum distance without overlapping onto itself. Keeping inflatable restraint 206 from being overlapped ensures that fluid communication remains open between drum 304 and inflatable restraint 206. In this manner, inflatable restraint 206 can be easily inflated at any adjustment position. For example, if drum 304 is a 3-inch diameter cylinder, then up to 175 mm of payout can be achieved without overlapping the inflatable restraint. Optionally, if more payout is desired, a larger diameter drum is used.

In an embodiment of the present invention, the cross-sectional area of drum 304 is preferably large enough to house inflator 302, to prevent the pinching and bunching of inflatable restraint 206, and to provide enough payout for shoulder belt length and height adjustments. For example, in the case of a circular cross section (i.e., a cylindrical drum), the diameter is preferably large enough to allow smooth retraction of inflatable restraint 206, as well as uniform inflation without pinching the inflatable restraint and constricting gas flow. In addition to a preferable size, drum 304 is also preferably adapted to contain the inflating gas to build pressure that initiates a pressure-actuated locking mechanism of drum 304 (described below).

For optimal inflation performance, the cross-sectional area of drum 304 is large to improve retraction of inflatable restraint 206 and to reduce the possibility of pinching inflatable restraint 206 during deployment such that no gas flows. In addition, the large cross-sectional area provides room for inflator 302 to be incorporated at the axis of rotation of drum 304. In an embodiment of the present invention, the cross-section is circular with a diameter of at least approximately 50 mm.

Inflator 302 is in fluid communication with drum 304. Preferably, at least a portion of inflator 302 is mounted inside of drum 304. More preferably, inflator 302 is mounted on the inside of drum 304 and rotates freely with inflation integrated inertia reel 210. By integrating the inflator into drum 304, the drum 304 acts as an inflator housing and pressure vessel that contains discharged gas and ducts the gas to inflatable restraint 206. Locating inflator 302 inside drum 304 also significantly reduces inertial loads in comparison to translating inflator systems. As an alternate embodiment, inflator 302 can be rigidly mounted to the frame of inflation integrated inertia reel 210 on drum 304's axis of rotation such that drum 304 rotates around inflator 302.

In normal operation, the inflatable seat belt restraint system of the present invention allows the adjustment of lap belt 200 using lap belt inertia reel 208 and the adjustment of shoulder belt 202 using inflation integrated inertia reel 210. Mounted above the seat, inflation integrated inertia reel 210 can travel up and down by movement on its mount or by movement of the structure to which it is mounted. For example, inflation integrated inertia reel 210 could be mounted to the adjustable headrest of a seat. In addition, inflatable restraint 206 can be deployed in any reel orientation.

Figures 5A, 5B:
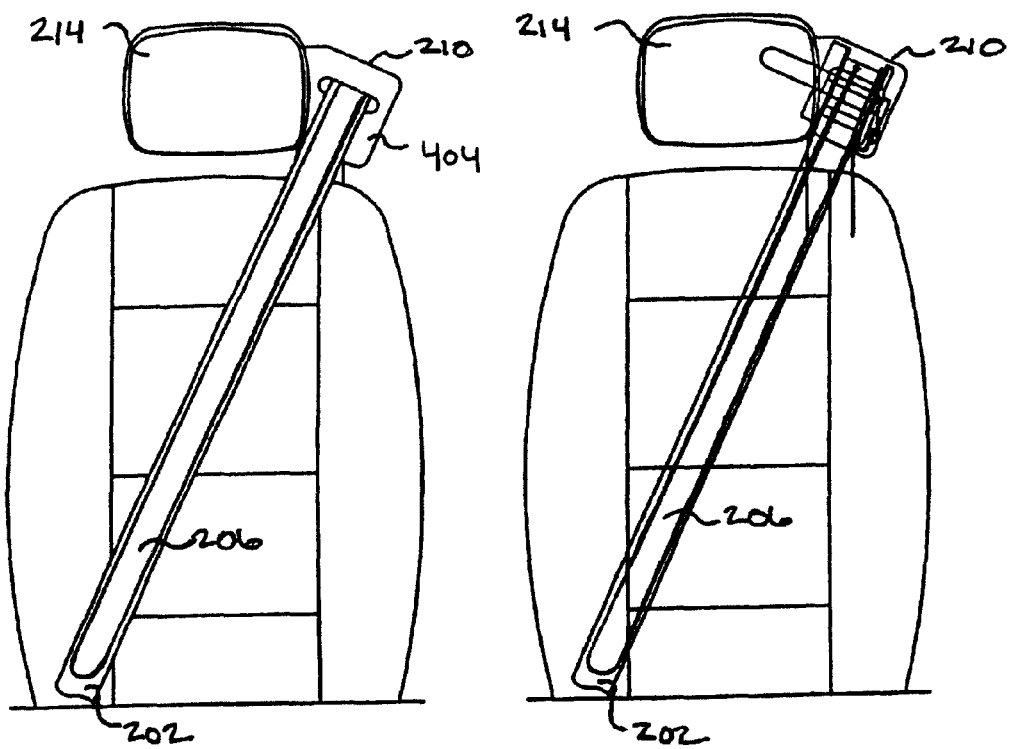
FIGS. 5a–5d are schematic diagrams of an embodiment of the inflatable seat restraint system of the present invention, shown in different shoulder belt height adjustment positions, with (FIGS. 5a and 5c) and without (FIGS. 5b and 5c) covers for the inflation integrated inertia reel.
Figures 5C, 5D:
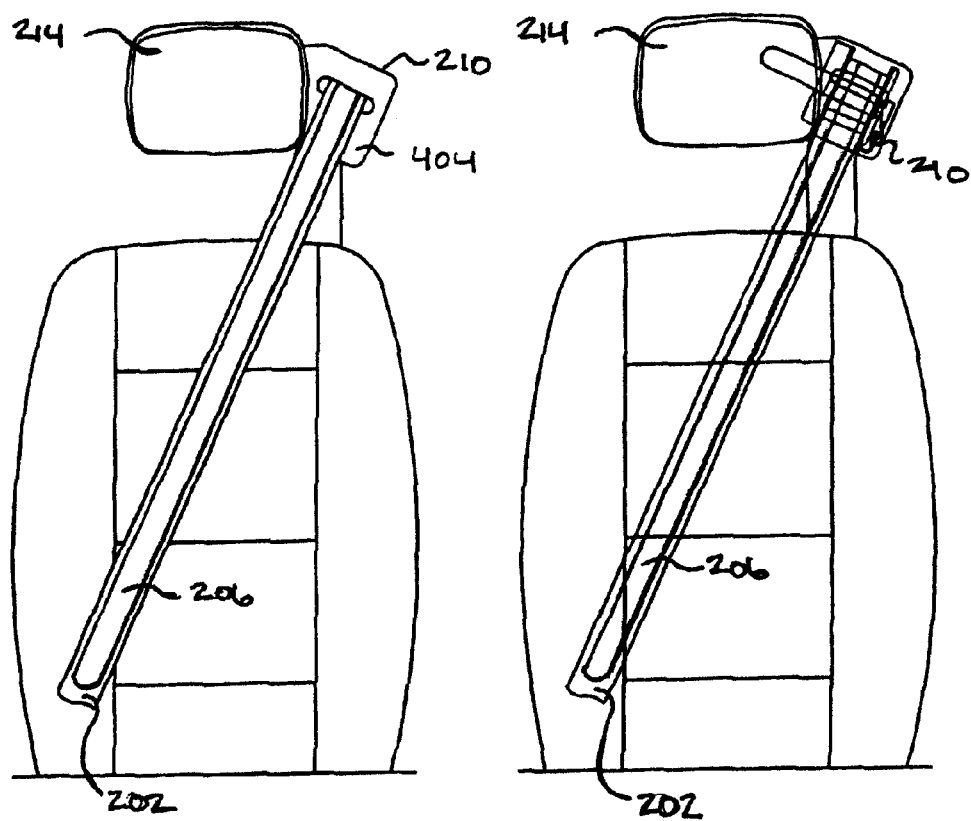

FIGS. 5a–5d illustrate the adjustment of shoulder belt 202 by inflation integrated inertia reel 210, as headrest 214 is raised from the position shown in FIGS. 5a and 5b to the position shown in FIGS. 5c and 5d. FIGS. 5a and 5c show inflation integrated inertia reel 210 with a decorative cover 404, while FIGS. 5b and 5d show inflation integrated inertia reel 210 with decorative cover 404 removed. Both the webbing of shoulder belt 202 and the inflatable restraint 206 to which it is attached spool onto inflation integrated inertia reel 210. As inflation integrated inertia reel 210 is raised to accommodate larger occupants, drum 304 rotates to pay out additional lengths of shoulder belt 202 and inflatable restraint 206. When inflation integrated inertia reel 210 is then lowered for smaller occupants, drum 304 rotates to retract the additional lengths of shoulder belt 202 and inflatable restraint 206. Because inflatable restraint 206 spools onto inflation integrated inertia reel 210, the inflatable seat belt restraint system of the present invention can deploy inflatable restraint 206 at any point along the rotation of drum 304, and can lock drum 304 and deploy inflatable restraint 206 for maximum protection of the vehicle occupant.

Referring again to FIGS. 2, 3, and 4a–4c, upon deployment, inflator 302 discharges gas into the interior of drum 304. The gas pressurizes drum 304, forcing gas out of port 306 and into inflatable restraint 206. Because inflation integrated inertia reel 210 fills inflatable restraint 206 from the area of the occupant's shoulder, inflatable restraint 206 inflates in one direction from the shoulder toward buckle assembly 204, instead of inflating up and over the occupant's shoulder as with some prior art systems. This method of inflation eliminates the need for an intermediate guide. As a result, inflatable restraint 206 inflates smoothly and evenly over drum 304, making the present invention much less susceptible to the kinking and bunching problems of the prior art systems.

By using retractable inflation integrated inertia reel 210, the present invention can inflate inflatable restraint 206 in any adjustment position without having to fix the upper end of the inflatable restraint. This flexible design is easily adaptable to any inflatable restraint that uses a remote inflator, such as the INFLATABAND™, Inflatable Tubular Torso Restraint by Simula, and TAKATA™ inflatable restraints. The present invention can be used as the shoulder belt inertia reel for virtually any restraint system that uses an inflatable belt system, including restraint systems used in such applications as aviation, automobiles, and military vehicles.

According to an embodiment of the present invention, in conjunction with the deployment of inflatable restraint 206, drum 304 locks to prevent further pay out of shoulder belt 202 and inflatable restraint 206. As shown in FIG. 3, this locking can be provided by a conventional inertia reel locking mechanism, e.g., webbing sensing lock mechanism. Such a locking mechanism is analogous to the vehicle-sensing element of existing inertia reels, by which centrifugal motion is used to actuate the lockup of the inertia reel through a series of levers and detents.

However, according to another embodiment of the present invention, inflation integrated inertia reel 210 uses a pressure-actuated locking mechanism. Because inflation typically occurs well before the occupant loads the inflatable seat restraint system, the inflation gas pressure can trigger a locking mechanism at a time sooner than a conventional webbing sensing locking mechanism. Thus, the pressure-actuated locking mechanism would lock the system at a time earlier in the deployment sequence, thereby reducing the extent of the occupant movement and increasing occupant protection.

Figure 6A:
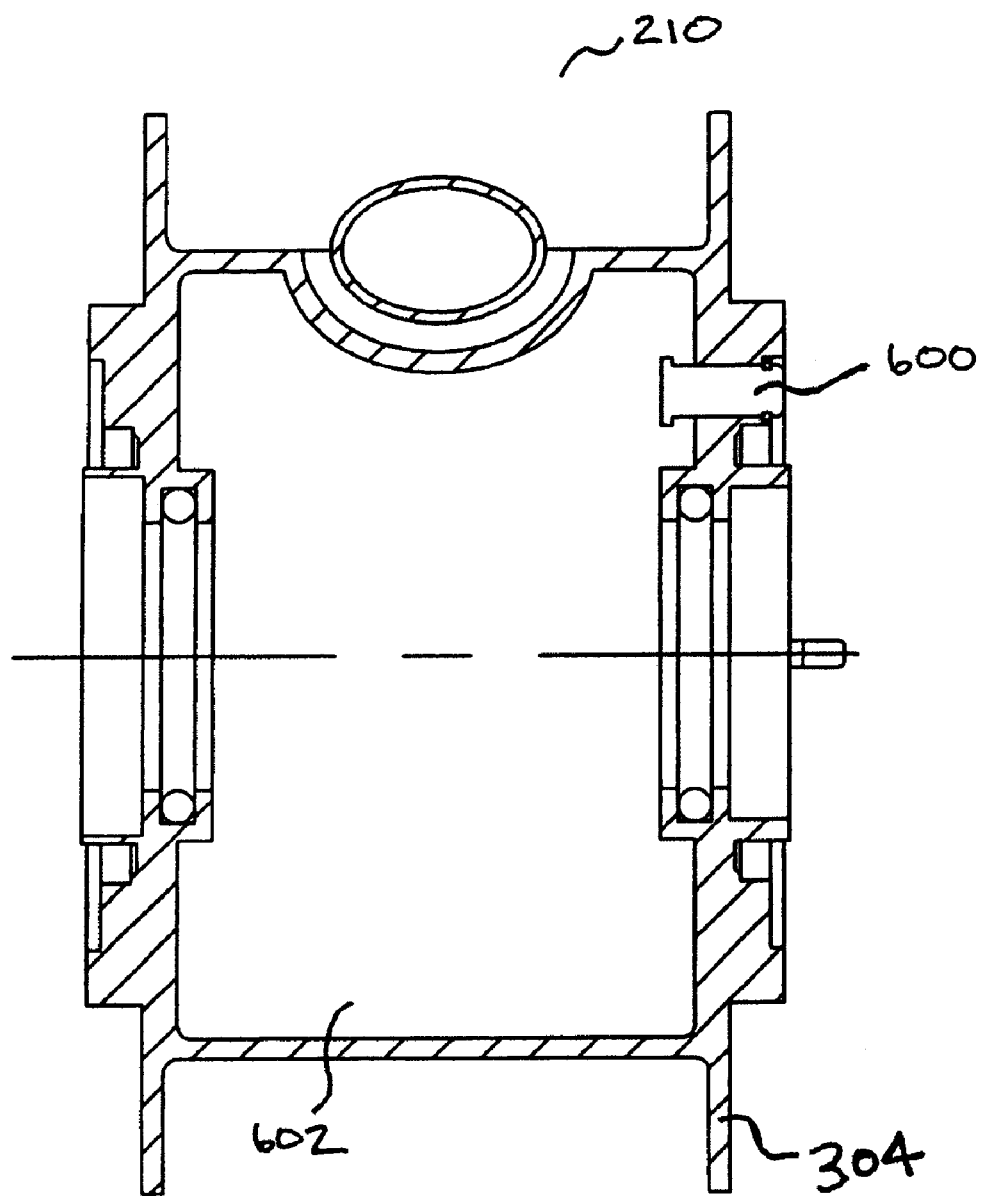
FIG. 6a is a schematic diagram of an inflation integrated inertia reel having a pressure-actuated locking mechanism with one pin, according to an embodiment of the present invention.

According to this embodiment of the present invention, an example of which is shown in FIG. 6a, the pressure-actuated locking mechanism includes at least one pin 600 to engage a frame on which inflation integrated inertial reel 210 is mounted. Preferably, the at least one pin 600 is located on an axial side of drum 304. Pin 600 is in communication with the pressure vessel 602 of drum 304. In FIG. 6a, inflation integrated inertia reel 210 has not been deployed and inflator 302 of inflation integrated inertia reel 210 has not been activated, therefore leaving pressure vessel 602 unpressurized. When inflation integrated inertia reel 210 is deployed and pressure vessel 602 is pressurized, pin 600 is forced axially out of drum 304 to engage a hole in the frame of inflation integrated inertia reel 210. This pressure-actuated lock would function in any attitude or orientation.

Figure 6C:
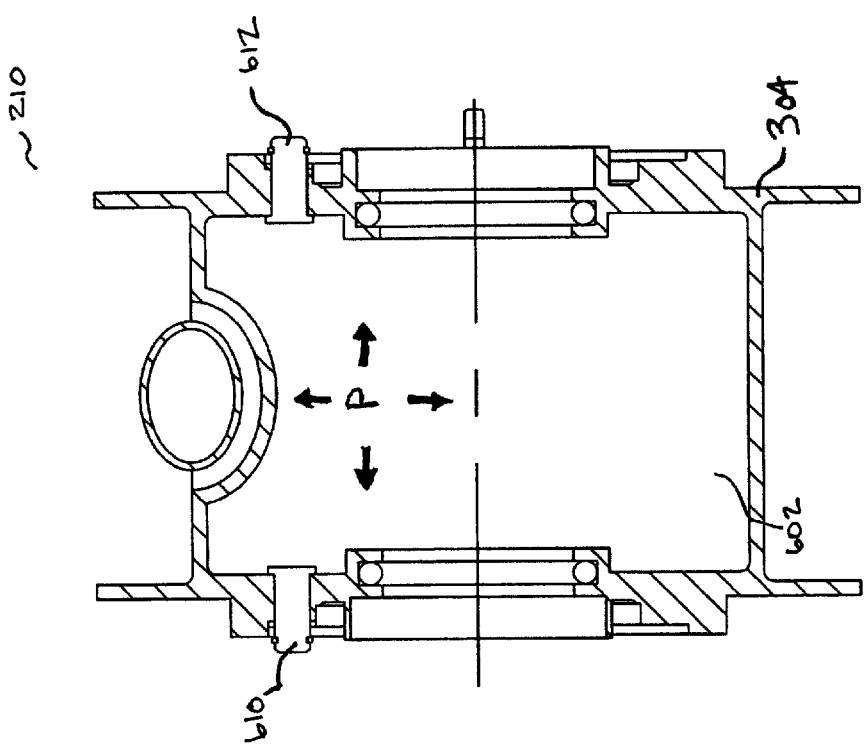
FIG. 6c is a schematic diagram of the inflation integrated inertia reel shown in FIG. 6b, with the pins forced out and the inertia reel locked.
Figure 6B:
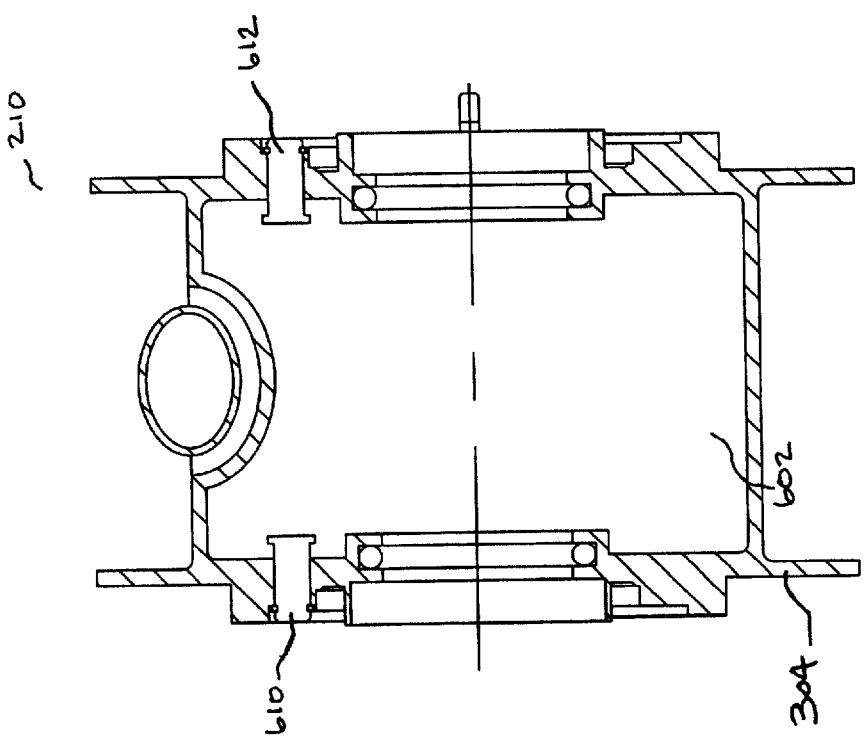
FIG. 6b is a schematic diagram of an inflation integrated inertia reel having a pressure-actuated locking mechanism with two pins in a stowed position, according to an embodiment of the present invention.

Instead of a single pin, the pressure-actuated locking mechanism could include two opposed pins 610 and 612 on the axial sides of drum 304, as shown in FIGS. 6b and 6c. FIG. 6b shows pins 610 and 612 in a stowed position before pressure vessel 602 is pressurized. FIG. 6c shows pins 610 and 612 after pressure vessel 602 is pressurized, when pins 610 and 612 are forced axially outward by pressure P in pressure vessel 602. The arrows of pressure P represent the force of pressure P pushing outward on the walls of pressure vessel 602 and on pins 610 and 612. In FIG. 6c, pins 610 and 612 engage the frame of inflation integrated inertia reel 210 and lock drum 304 in place.

Alternately, pins 610 and 612 could engage detents on the inertia reel housing to lock the inertia reel. This arrangement would directly transfer the loads from the inertia reel to the inertia reel housing.

In an embodiment of the present invention, inflation integrated inertia reel 210 is of a cast construction so that components such as drum 304, port 306, and webbing connection 400 can be cast into the part. As an example of an acceptable design, a conventional inertia reel design could be expanded radially to accommodate an approximately 1-inch diameter opening along its axis. Inflation integrated inertia reel 210 would also include means for sealing the gas within drum 304. For example, O-ring grooves could be cast into the part between rotating drum 304 and inflator 302.

In an alternate embodiment of the present invention, as shown in FIG. 4a, inflation integrated inertia reel 210 includes a shroud 402 placed around a portion of inflation integrated inertia reel 210 to limit the inflation of inflatable restraint 206 in the vicinity of inflation integrated inertia reel 210. Shroud 402 prevents decorative cover 404 (as shown in FIGS. 4a, 5a, and 5c) from detaching or becoming damaged during the deployment.

Thus, the present invention provides several significant benefits over prior art systems: 1) it eliminates the need for a separate inflator housing; 2) it reduces the amount of high pressure hose; 3) it eliminates the problems with a sliding or translating inflator for a system that moves the inflator with the movement of the inflatable restraint; 4) it simplifies component connections; 5) it uses internal gas pressure in the drum of the inflation integrated inertia reel to initiate reel lock up; 6) it provides compact, cost effective designs that do not require an additional housing or lengths of high pressure hose; 7) it provides an inflation integrated inertia reel with a low inertia compared to a translating inflator system, because the device rotates about the center of the inflator and reel axes; and 8) it provides a device that can move up and down with the headrest.

Figures 7A, 7B:
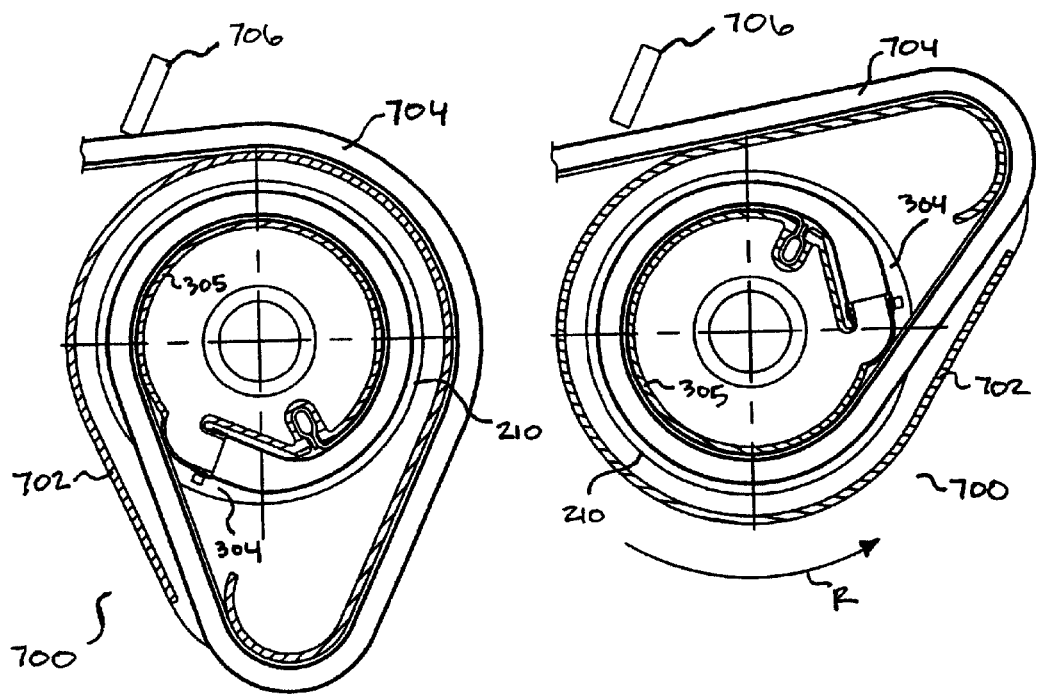
FIG. 7a is a schematic diagram of an inertia reel lever arm with its belt fully retracted, according to an alternate embodiment of the present invention.
FIG. 7b is a schematic diagram of the inertia reel lever arm shown in FIG. 7a rotating to pay out its belt.
Figures 7C, 7D:
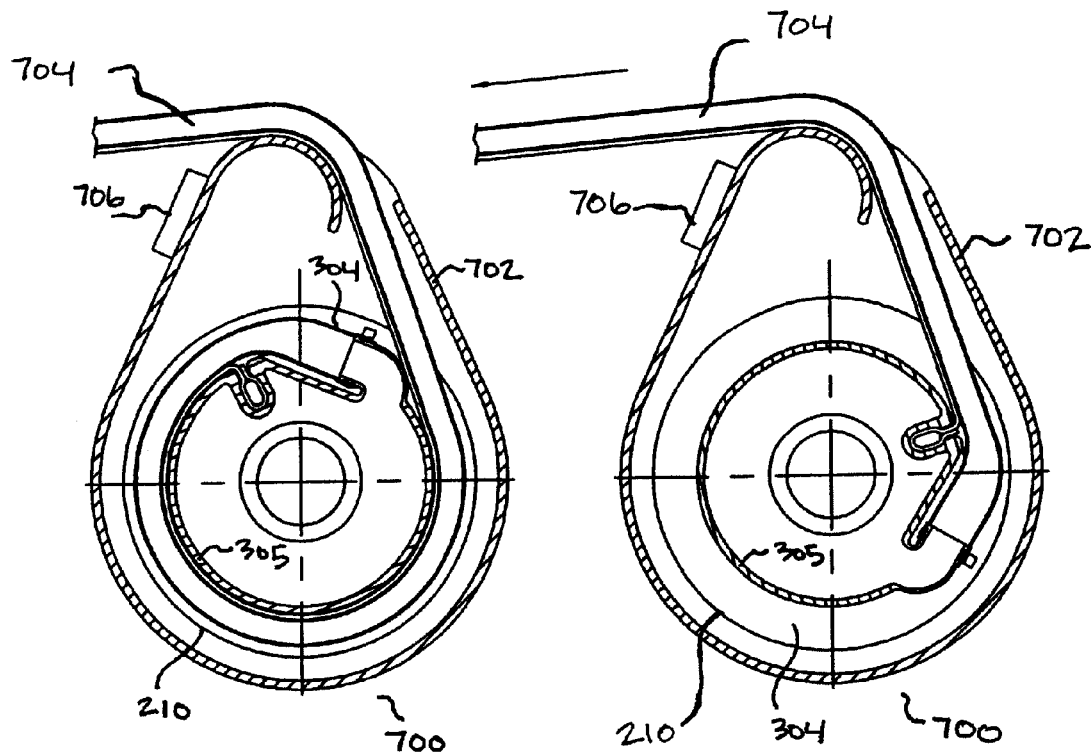
FIG. 7c is a schematic diagram of the inertia reel lever arm shown in FIG. 7a, with its lever arm contacting a stop and with its inflation integrated inertia reel yet to rotate independently of the lever arm.
FIG. 7d is a schematic diagram of the inertia reel lever arm shown in FIG. 7a, with its lever arm contacting a stop and with its inflation integrated inertia reel rotated independently of the lever arm to pay out an additional belt length.
Figure 8:
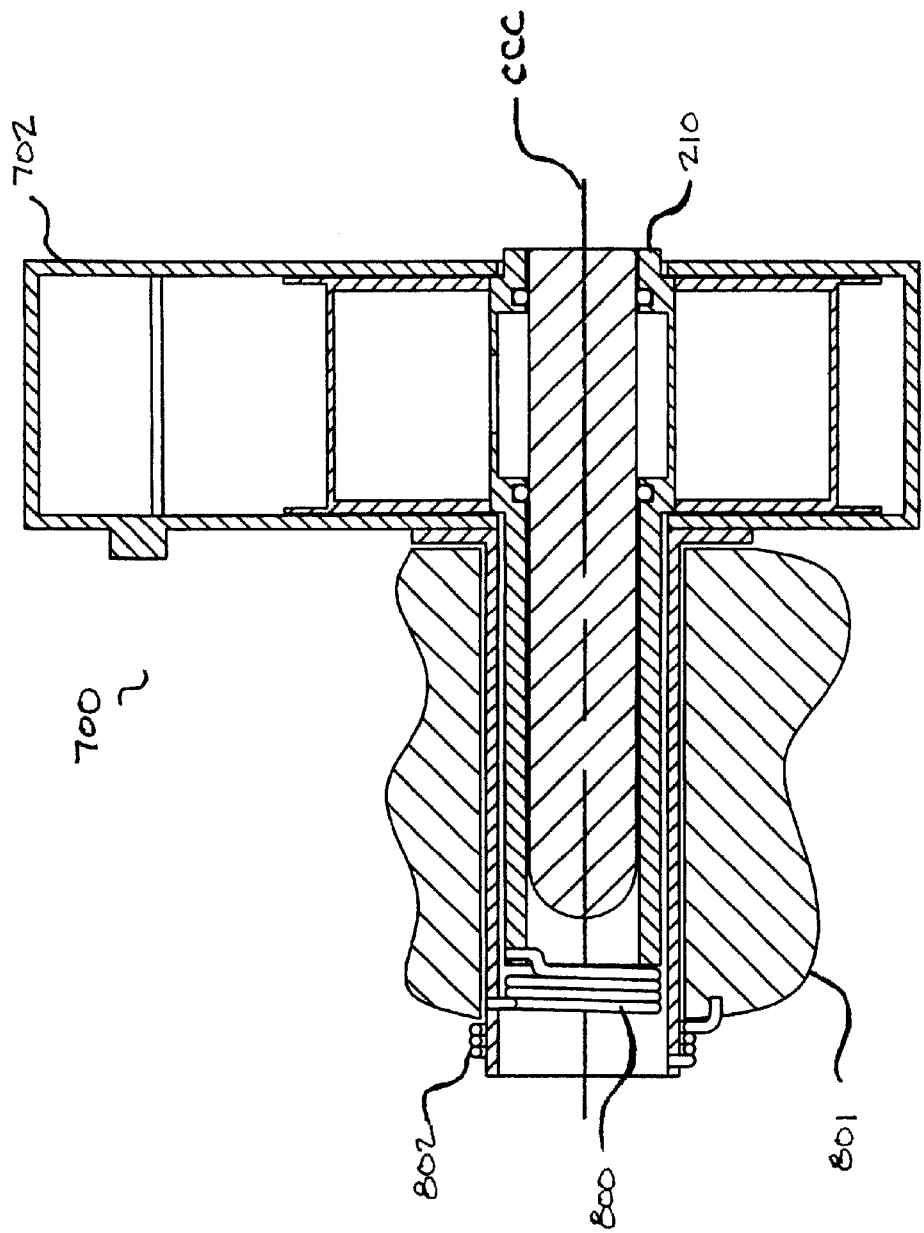

FIGS. 7a–d and 8 illustrate an alternate embodiment of the present invention, referred to herein as an inertia reel lever arm 700. Inertia reel lever arm 700 provides all of the benefits of the embodiments described above, and, in addition, provides a further aspect of shoulder belt adjustment. As shown in FIGS. 7a–d and 8, inertia reel lever 700 preferably includes inflation integrated inertia reel 210, lever arm 702, coil springs 800 and 802, belt 704, and stop 706. FIGS. 7a–d show progressive positions of inertial reel lever arm 700 as it lets out belt 704, according to this alternate embodiment of the present invention. FIG. 8 shows a cross-section of inertia reel lever arm 700, according to this alternate embodiment.

In this embodiment, inflation integrated inertia reel 210 is housed inside lever arm 702, and is connected to lever arm 702 by coil spring 800. Lever arm 702 is, in turn, connected to a seat back 801 by a coil spring 802, which provides less spring force than coil spring 800. Both inflation integrated inertia reel 210 and lever arm 702 are axially mounted such that they rotate about the same axis CCC. Because coil spring 800 is stronger than coil spring 802, lever arm 702 and inflation integrated inertia reel 210 rotate together as the shoulder belt 704 is pulled (for example, rotating from the position shown in FIG. 7a to the position shown in FIG. 7b). Arrow R in FIG. 7b shows the counterclockwise direction of rotation.

Stop 706 prevents lever arm 702 from rotating past a predetermined orientation, as dictated by the geometry of the inflatable seat restraint system (e.g., the required length of payout or the required height of the shoulder belt during deployment). Thus, as lever arm 702 and inflation integrated inertia reel 210 rotate together, lever arm 702 eventually contacts stop 706, at which point lever arm 702 stops rotating (as shown in FIG. 7c). Inflation integrated inertia reel 210 continues to rotate independently of lever arm 702 as shoulder belt 704 is pulled (as shown in FIG. 7d). Once lever arm 702 is stopped, shoulder belt 704 pulls against coil spring 802 only, and not against coil spring 800.

After lever arm 702 is stopped, the continued rotation of inflation integrated inertia reel 210 provides an occupant with additional payout of shoulder belt 704, which accommodates such situations as when the occupant needs to reach for an object beyond a normal operating position. Once the occupant returns to the normal operating position, the additional payout of shoulder belt 704 spools back onto inflation integrated inertia reel 210 first because of the high coil spring force of coil spring 800. As shoulder belt 704 continues to retract, lever arm 702 eventually rotates away from stop 706.

This lever arm configuration affords two levels of belt adjustment. First, lever arm 702 rotates to take up and pay out slack to accommodate differences in occupant size. Second, once lever arm 702 rotates against stop 706, inflation integrated inertia reel 210 rotates to pay out and take up slack needed for extended payout, such as when an occupant must move out of a normal seated position to reach for an object. Thus, this alternate embodiment of the present invention provides an additional aspect of belt adjustment in addition to the benefits described above for the other embodiments.

In addition, this alternate embodiment provides an automatic belt height adjustment, as best shown by the progressive positions depicted in FIGS. 7a–7d. Inertia reel lever arm 700 is shaped so that the distance between axis CCC and the location at which belt 704 comes off of inertia reel lever arm 700 changes as inertia reel lever arm 700 rotates around axis CCC. Preferably, inertia reel lever arm 700 is oblong, or cam shaped, so that belt 704 raises as lever arm 702 rotates around to stop 706. Generally, smaller occupants require a shorter belt length and a lower belt height, while larger occupants require a longer belt length and a higher belt height. The oblong inertia reel lever arm 700 accommodates these relationships by raising the belt height as more belt length is paid out.

Thus, for example, in FIG. 7a, inertia reel lever arm 700 has paid out relatively little belt length and the belt height is at its lowest position—for the smaller occupant configuration. In contrast, in FIG. 7c, inertia reel lever arm 700 has paid out substantially all of the size-adjusting belt length and the belt height is at its highest position—for the larger occupant configuration.

In this alternate embodiment of the present invention, coil spring 802 is adapted to provide comfortable tension in shoulder belt 704 for normal use. Coil spring 800 is adapted to provide higher tension in belt 704 when belt 704 is fully extended. These spring forces and the shape of inertia reel lever arm 700 ensure that shoulder belt 704 is located properly on the occupant, on lever arm 702, and on inflation integrated inertia reel 210.

This alternate embodiment of the present invention can incorporate typical locking mechanisms, e.g., conventional inertia reel locking mechanisms, to lock lever arm 702 and inflation integrated inertia reel 210. However, pressure-actuated pins can lock inflation integrated inertial reel 210, as described above.

The above alternate preferred embodiment describes the separately rotating lever arm 702 and inflation integrated inertia reel 210 as providing both belt length and belt height adjustment. However, belt height adjustment could be provided in a similar manner using only drum 304 (referring to FIG. 4a, for example), without lever arm 702. For example, excluding lever arm 702, drum 304 itself could be shaped to change the height at which belt 704 comes off of drum 304 as drum 304 rotates. Specifically, as described above for lever arm 702, drum 304 could be oblong such that belt 704 raises as drum 304 rotates counterclockwise. The oblong shape could be provided, for example, by arm 305 of drum 304.

Although described herein with respect to a single type of inertia reel, one of ordinary skill in the art would appreciate that the present invention is applicable to other types of inertia reels, as well as load limiters, adjusters, and other devices that are used to adjust restraints. Accordingly, the scope of the invention should be determined not by the examples of embodiments illustrated herein, but by the appended claims and their equivalents.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An inflatable seat restraint system comprising:
   a) an anchor anchored to a vehicle on a first side of a seat;
   b) a shoulder belt attached to the anchor;
   c) an inflatable restraint attached to the shoulder belt; and
   d) an inertia reel attached to the shoulder belt and the inflatable restraint, and anchored above the seat,
   wherein the inertia reel retracts and pays out the inflatable restraint and shoulder belt, and inflates the inflatable restraint upon deployment of the inflatable seat restraint system.

2. The system of claim 1, wherein the anchor is a buckle assembly.

3. The system of claim 1, wherein the inertia reel is anchored to a headrest above the seat,
   wherein the inertia reel pays out the shoulder belt and the inflatable restraint as the headrest rises, and
   and wherein the inertia reel retracts the shoulder belt and the inflatable restraint as the headrest lowers.

4. The system of claim 2, further comprising:
   e) a lap belt inertia reel anchored to the vehicle on a second side of the seat; and
   f) a lap belt attached to the lap belt inertia reel and the buckle assembly.

5. The system of claim 2, further comprising:

e) a lap belt inertia reel anchored to the vehicle on a second side of the seat; and f) a lap belt attached to the lap belt inertia reel and the shoulder belt, wherein the lap belt and the shoulder belt are a single belt attached to the inertia reel and the lap belt inertia reel, and slideably attached to the buckle assembly.

6. A method for deploying an inflatable seat belt restraint system comprising the steps of:

anchoring webbing to a drum;

anchoring an inflatable restraint to the drum such that the inflatable restraint lays on top of the webbing as the drum spools up and pays out, wherein the drum is in fluid communication with the inflatable restraint;

preventing the drum from rotating past one revolution;

filling the drum with inflation gas; and inflating the inflatable restraint.

7. The method of claim 6, further comprising the step of stopping the drum from rotating by actuating, with the inflation gas, at least one pin connected to the drum.

8. The method of claim 6, further comprising the step of changing the height at which the webbing and the inflatable restraint come off of the drum as the drum rotates.

* * * * *